United States Patent [19]
Lagarias et al.

[11] Patent Number: 5,999,566
[45] Date of Patent: *Dec. 7, 1999

[54] METHOD AND APPARATUS FOR PROVIDING ERROR-TOLERANT COMMUNICATION OF INFORMATION

[75] Inventors: Jeffrey C. Lagarias, Summit; Nuggehally S. Jayant, Gillette, both of N.J.

[73] Assignee: Lucent Technologies Inc., Murray Hill, N.J.

[ * ] Notice: This patent is subject to a terminal disclaimer.

[21] Appl. No.: 08/715,983

[22] Filed: Sep. 19, 1996

[51] Int. Cl.$^6$ .............. H04B 17/00; H04B 3/46; H04Q 1/20
[52] U.S. Cl. .............. 375/224; 380/9; 714/701
[58] Field of Search .............. 380/19, 20, 9, 380/21, 42, 48–50, 36; 375/224, 227, 285, 296, 254, 346, 257, 259, 219, 356; 714/701

[56] References Cited

U.S. PATENT DOCUMENTS

| | | |
|---|---|---|
| 3,679,977 | 7/1972 | Howson . |
| 3,700,819 | 10/1972 | Marcus . |
| 4,100,374 | 7/1978 | Jayant et al. . |
| 5,056,112 | 10/1991 | Wei . |
| 5,295,159 | 3/1994 | Kerpez . |
| 5,384,722 | 1/1995 | Dulong .............................. 364/715.01 |
| 5,438,293 | 8/1995 | Guerrieri et al. ........................ 327/355 |
| 5,506,848 | 4/1996 | Drakopoulos et al. . |
| 5,594,435 | 1/1997 | Remillard .................................. 341/51 |

*Primary Examiner*—Chi H. Pham
*Assistant Examiner*—Jean B Corrielus

[57] ABSTRACT

The device and method according to the present invention permute the order of signals representing information intended for transmission over a communication medium. The signal ordering is permuted prior to or at the time of transmission over the communication medium such that when the information or data is transmitted in the permuted order, it is more tolerant to data corrupting defects, such as a faulty communications line, or events, such as an electromagnetic pulse, that exist or may occur during the communication process.

13 Claims, 1 Drawing Sheet

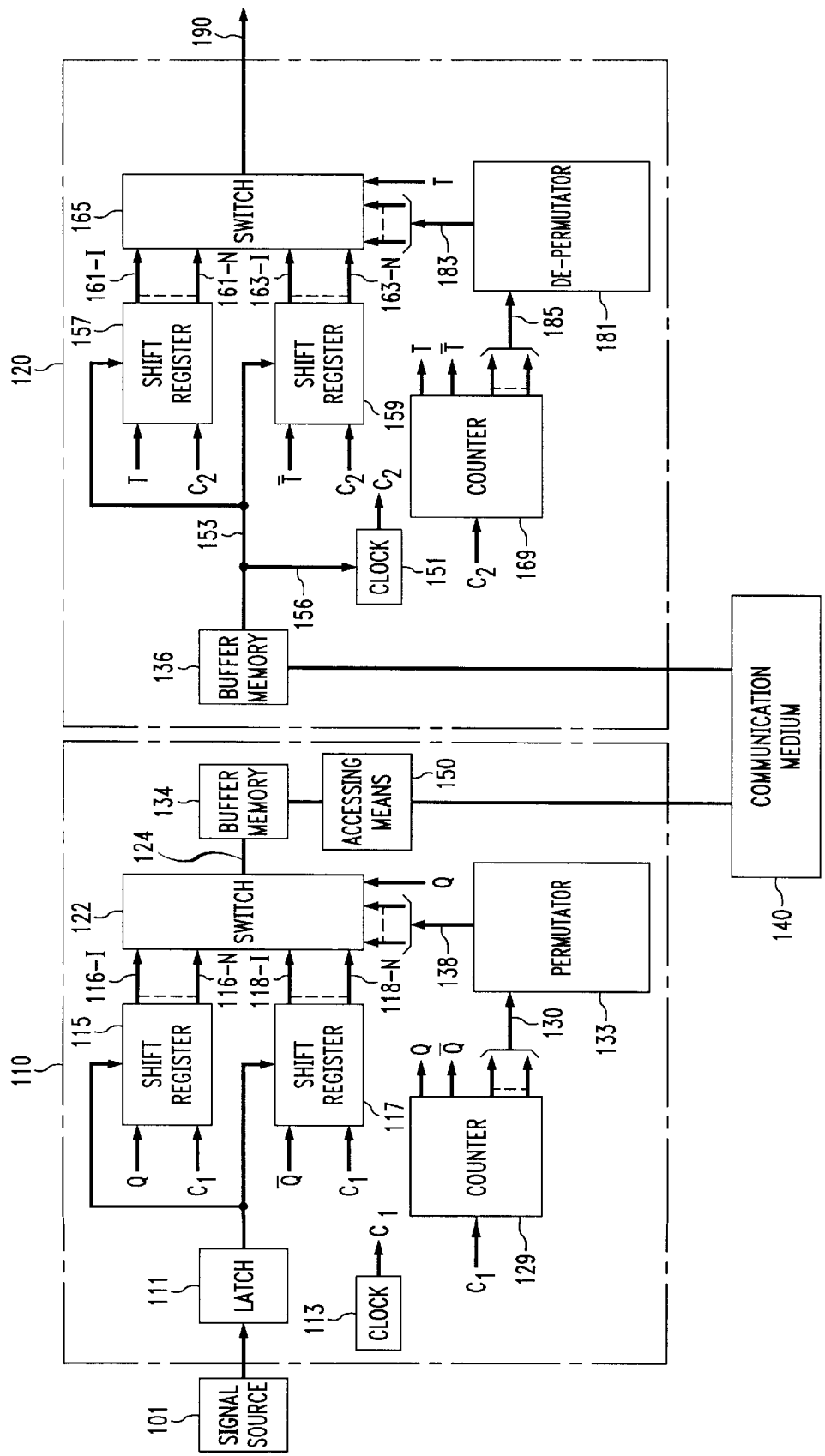

METHOD AND APPARATUS FOR PROVIDING ERROR-TOLERANT COMMUNICATION OF INFORMATION

BACKGROUND OF THE INVENTION

1. Technical Field

This invention relates to a method and a circuit for providing error-tolerant communication of information such as digital data or signals in a permuted order over a communication medium.

2. Discussion of Related Art

Recent advances in the area of electronic telecommunications have made it possible to transmit information allocated within communication packets or groups having an increased density at very high transmission rates. Generally, the higher the density of a communication packet or group, the more digital signals or samples are transmitted within that particular group. However, the increased density renders the communication group less error tolerant from data corrupting defects, such as a faulty communications line, or events, such as an electromagnetic pulse, that exist or may occur during the communication process. For example, if a magnetic storm passes through a given area of the communication medium, the electromagnetic pulse which may result could cause data corruption in the one or more communication groups and the loss of data integrity required when data is received at the receiving station. Therefore, a need exists to provide error-tolerant communication of information over a communication medium.

SUMMARY OF THE INVENTION

The method and circuit according to the present invention provide error-tolerant communication of information over a communication medium. Generally, the information is arranged or assigned in a permuted order wherein consecutive elements of the information are transmitted in well-separated time order or locations over the communication medium. The information may be in the form of digital data bits, samples of audiovisual signals or blocks of samples. If the information is time-ordered or is sequential, the method and circuit of the invention permute the time-ordering or the sequence associated with the elements of the information prior to or at the time of transmittal of the elements over the communication medium. When the information is received, the original time-ordering or sequence of the elements of the information is restored by de-permuting or inverting the writing or transmittal scheme.

A method according to the illustrative embodiment of the present invention provides error-tolerant communication of information over a communication medium, the method comprising the steps of:

partitioning the information into groups, at least one of the groups is represented by a plurality of samples in consecutive time order and being suitable for transmission over a communication medium;

arranging the plurality of samples in a permuted order; and, transmitting the plurality of samples in the permuted order whereby consecutive samples are transmitted nonconsecutively over the communication medium.

The method further includes the steps of:

receiving the plurality of samples transmitted over the communication medium; and, rearranging the received plurality of samples in a de-permuting order to reconstruct at least one of the groups in consecutive time order.

Preferably, the step of reconstructing at least one of the groups includes reconstructing samples in the consecutive time order despite the existence of data corrupting defects or events which exist in the communication medium or may occur during the communication process.

The step of arranging the plurality of samples in a permuted order according to the illustrative embodiment of the present invention provides a Manhattan distance of at least 2 between any consecutive samples of at least one of the groups. The consecutive samples are arranged and stored in a buffer memory having M×N storage sites before they can be transmitted at an appropriate time. The consecutive samples do not occupy the same row or column of the M×N storage sites. A Manhattan distance is a term known in the field as the sum of the horizontal distance and the vertical distance between two objects.

The illustrative method according to the invention also arranges the bit-ordering to provide a well-separated distance between consecutive bits, e.g., a Manhattan distance of 5 for 6×6 storage sites. The method further arranges the bit ordering such that consecutive bits do not occupy the same row or column.

Another illustrative embodiment of the present invention is a circuit for providing error-tolerant communication of digital signals, which comprises:

a storage medium having at least one area definable by M×N storage sites;

means for time-ordering the digital signals into S consecutive samples, S being equal to M×N;

a permutator for permuting the time-ordering of the S consecutive samples;

means for storing the S permutated samples in the storage medium;

means for accessing the storage medium including means for retrieving the S permutated sample from the storage medium and transmitting the S permutated samples over the communication medium where neighboring samples of the S consecutive samples are transmitted in non-neighboring time slots over the communication medium.

Preferably, the circuit according to the illustrative embodiment permutes the S consecutive samples in an order which well separates the distance between any neighboring samples, e.g., by a Manhattan distance of at least 2, and consecutive samples do not occupy the same row or column of the storage medium and thus the S consecutive samples are transmitted nonconsecutively over the communication medium.

The circuit further includes a buffer memory and a decoder for receiving the S samples transmitted over the communication medium and for decoding the permuted order to recover the original time ordering of the S consecutive samples.

Advantageously, the illustrative technique according to the present invention of separation and transmittal of consecutive samples facilitates error tolerance due to data corrupting defects or events that exist or may occur during the communication process. Further, in the case in which the transmitted signal is a digital data sequence, and error-correcting coding is involved, the illustrative technique separates or "de-clusters" errors that require correction; thus, the technique makes simpler the error correction process. In the case in which the transmitted signal is an audio or video signal, the illustrative technique permits simpler signal enhancement at the receiving end by known techniques such as nearest neighbor interpolation.

BRIEF DESCRIPTION OF THE DRAWINGS

FIG. 1 illustrates a block diagram of a circuit for providing error-tolerant communication of information according to an illustrative embodiment of the present invention.

DETAILED DESCRIPTION OF PREFERRED EMBODIMENTS

The device according to the illustrative embodiment of the present invention includes means for permuting the order of signals representing the information intended for transmittal over a communication medium. The signal time-ordering is permuted prior to or at the time of transmittal such that when the information or data is transmitted in the permuted order, it is more tolerant to data corrupting defects or events that exist, and/or that may occur during the communication process.

FIG. 1 shows a circuit arrangement in which a signal or information from signal source 101 is processed by encoder 110 to provide error-tolerant transmittal of the information over the communication medium 140.

Signal source 101 is an information source which is preferably digital data. The signal source 101 may also be in the form of analog signals such as human speech. The analog signals are digitized by a known sampling circuit (not shown) prior to being forwarded to encoder 110. Clock 113 supplies clock signal C1 to synchronize the signal source to encoder 110.

The output of data latch 111 is connected to the input of shift registers 115 and 117. Counter 129 is an n stage counter operative responsive to clock signal C1 from clock 113 to provide a coded output corresponding to the first n stages of the counter in complementary signals Q and Q' corresponding to the last counter stage. Thus, for the first n counts of the clock pulses, signal Q' is enabling and signal Q is inhibiting. Responsive to counter signal Q' and clock pulses C1, the output of data latch 111 is serially inserted into shift register 117. At this time, signal Q from counter 129 inhibits shift register 115 so that the previous n outputs from signal source 101 are temporarily stored therein.

For illustration, assume that shift register 115 is adapted to temporarily store 36 successive bits of signal source 101. Each of the stages of shift register 115 is connected to an input of switch 122, and switch 122 is operative responsive to each clock pulse to selectively transfer 1 of the 36 bits from register 115 to line 124. Switch 122 is addressed by the output of permutator 133, which is responsive to the output of stages 1 through 36 of counter 129.

According to the present illustrative embodiment, permutator 133 may be in the form of a look-up table or a customized sequencer. Permutator 133 responds to counter outputs 130 to generate control codes for appropriately switching the data output for storage in buffer memory 134. The permuted data is then accessed and outputted over the communication medium 140 by accessing means 150 in accordance with the protocol, timing or error-correction schemes appropriate for the respective communication system. In the case in which a look-up table is used, the counter outputs an address for outputting the control codes stored in the look-up table to switch 122. Similarly, a sequencer will output a preprogrammed control code depending upon the count from counter 129.

Buffer memory 134 may be sectionalized into M×N storage sites. For example, in a 6×6 memory site area, the bit order may be arranged as shown in Table 1:

TABLE 1

| Column (j) | 0 | 1 | 2 | 3 | 4 | 5 |
|---|---|---|---|---|---|---|
| Row (i) | | | | | | |
| 0 | 1 | 3 | 5 | 20 | 22 | 24 |
| 1 | 7 | 9 | 11 | 26 | 28 | 30 |
| 2 | 13 | 15 | 17 | 32 | 34 | 36 |
| 3 | 19 | 21 | 23 | 2 | 4 | 6 |
| 4 | 25 | 27 | 29 | 8 | 10 | 12 |
| 5 | 31 | 33 | 35 | 14 | 16 | 18 |

Permutator 133 in cooperation with switch 122 outputs the 36 bits in accordance with the order shown in the matrix above by rearranging each number according to the formula $$6k_1 + 2k_2 + k_3 \tag{1}$$

for numbers between 1 and 36, wherein $k_1$ is a modulo 6 number, $k_2$ is a modulo 2 number, and $k_3$ is a modulo 1 number. The numbers 1 to 36 can be expressed as shown in Table 2:

TABLE 2

| K | $k_1$ | $k_2$ | $k_3$ |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 0 | 2 | 0 |
| 6 | 0 | 2 | 1 |
| 7 | 1 | 0 | 0 |
| 8 | 1 | 0 | 1 |
| 9 | 1 | 1 | 0 |
| . | . | . | . |
| . | . | . | . |
| . | . | . | . |
| 35 | 5 | 2 | 0 |
| 36 | 5 | 2 | 1 | where $$(i,j) = k_1(1,0) + k_2(0,1) + k_3(3,3) \tag{2}$$

To illustrate the application of formula (2), take bit number 8 which, according to the modulo representation of Table 2, is 101. When applied to formula (2), the (i,j) position is 1(1,0)+0(0,1)+1(3,3)=(1,0)+(3,3)=(4,3) and bit number 8 can be found in the fourth row (i) and the third column (j).

As another example, bit number 26 is represented by 401 in Table 2 and (i,j)=4(1,0)+0(0,1)+1(3,3)=(4,0)+(3,3)=(7,3) which is equivalent to (1,3) in modulo 6. It can be seen that bit number 26 is placed in the first row (i) and the third column (j).

Note that in the matrix where M and N=6 as shown in Table 1, consecutive bit numbers are well separated, the minimum separation between successive bit numbers having a Manhattan distance of 5, and consecutive bit numbers do not occupy the same row or column of the matrix. For example, bit numbers 2 and 3 are separated by 2 columns and 3 rows.

Advantageously, when the bit pattern as shown in Table 1 and stored in buffer memory 134 is transmitted over the communication medium by rows or columns, it is apparent to one of ordinary skill in the art that such transmission arrangement is error tolerant to at least single or two dimensional data corrupting defects or events. For example, if the data is transmitted column by column and a portion of column O is corrupted for any reason, such as in a magnetic storm, the information recovered from decoding the uncorrupted transmitted data would still be intelligible.

To illustrate, suppose there exists data corruption due to noise in the communication medium which affected data denoted by (2,2) to (3,3) or error in bit numbers 17, 23, 32 and 2. Because the data corruption did not occur in consecutive or successive bit numbers, the information recovered from reading the buffer memory and decoding the matrix is still largely intact and when reconstructed, would still be intelligible. This is especially true if the communicated information is sampled audio signals.

In cases where the M×M matrix in which M is odd, the following formula is applicable:

$$M(i, j) = i(0, p-1) + j\left(\frac{p+1}{2}, \frac{p+1}{2}\right) \text{ for modulo } P \quad (3)$$

For example, a 5×5 matrix with M and N=5 wherein the bit numbers 1 to 25 are represented in lexicographic order is presented in Table 3.

TABLE 3

| Column | 0 | 1 | 2 | 3 | 4 |
|---|---|---|---|---|---|
| Row | | | | | |
| 0 | 1 | 24 | 17 | 15 | 8 |
| 1 | 21 | 19 | 12 | 10 | 3 |
| 2 | 16 | 14 | 7 | 5 | 23 |
| 3 | 11 | 9 | 2 | 25 | 18 |
| 4 | 6 | 4 | 22 | 20 | 13 |

It can be appreciated that the data transmitted is more error-tolerant the further away the distance is between successive bit numbers. Preferably, the encoder 110 according to the present invention permutes the bit order so that the Manhattan distance between successive bits is at least two and successive bits do not occupy the same row or column. In most instances, with consecutive bits in different columns or rows, a Manhattan distance of two will be tolerant to one-dimensional data corrupting defects or events, such as a defect which causes data corruption to any transmitted row or column during the communication process.

To recover the signal source data transmitted over communication medium 140, the encoding process performed by encoder 110 is reversed by decoder 120 wherein counter 169, clock 151, shift registers 157 and 159 and buffer memory 136 are reversed in timing order from the writing process in encoder 110. The permuted data communicated over the communication medium 140 is received by decoder 120 and written into buffer memory 136 in the order received. To extract or recover the actual data representing signal source 101, the buffer memory 136 is read and depermutation is performed by depermutator 181 in cooperation with switch circuit 165 to rearrange the bit numbers in the sequential ordering as output by signal source 101. The information output at line 190 is then the recovered version of signal source 101.

If error correction coding is employed, usually for the case in which the signal source is a digital data sequence, an error correcting coder (not shown) is connected to output 190. Because of the "declustering" of the data sequence from the technique according to the illustrative embodiments of the present invention, the error correction codec overhead is reduced. Numerous error correction schemes known to one ordinary skilled in the art are applicable to the circuit and method of the present invention.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

What is claimed is:

1. A method for providing error-tolerant communication of information comprising the steps of:

partitioning said information into groups, at least one of said groups is represented by a plurality of samples in consecutive time order and being suitable for transmission over a communication medium;

arranging said plurality of samples in a permuted order;

transmitting said permuted samples of said consecutive samples of said at least one of said groups to a storage medium in response to at least one clock pulse of a clock signal;

storing said permuted samples of said consecutive samples of said at least one of said groups in said storage medium having different columns and rows of M×N storage sites where neighboring samples of said consecutive samples occupy different rows and columns of said M×N storage sites;

accessing said plurality of samples in one of a column-by-column and a row-by-row method from said storage medium according to at least one communication protocol or timing arrangement; and transmitting said plurality of samples in said permuted order according to said at least one communication protocol or timing arrangement whereby consecutive samples are transmitted nonconsecutively over said communication medium.

2. The method according to claim 1, further including the steps of:

receiving said plurality of samples transmitted over said communication medium; and reconstructing said at least one of said groups in said consecutive time order by rearranging said received plurality of samples in a de-permuting order.

3. The method according to claim 2, wherein said step of reconstructing said at least one of said groups from said received samples includes reconstructing samples in said consecutive time order despite the existence of defects or events which cause data corruption in said communication medium.

4. The method of claim 1, wherein M and N are the same dimension.

5. A circuit for providing error-tolerant communication of digital signals over a communication medium, said circuit comprising:

a storage medium having at least one area definable by M×N storage sites;

means for time ordering said digital signals into S consecutive samples, S being equal to M×N;

a permutator for permuting said time ordering of said S consecutive samples;

means for transmitting said S permuted samples to said storage medium in response to at least one clock pulse of a clock signal;

means for storing each of said S permuted samples in different M×N storage sites of said storage medium where neighboring samples of said S consecutive samples occupy different rows and columns of said M×N storage sites;

means for accessing said permuted samples of said S consecutive samples from said storage medium in one of a column-by-column and a row-by-row method according to at least one communication protocol or timing arrangement and transmitting said permuted samples of said S consecutive samples over said communication medium according to said at least one communication protocol or timing arrangement, wherein neighboring samples of said S consecutive samples are transmitted in non-neighboring time slots over said communication medium.

6. The circuit according to claim 5, wherein said permutator permutes said S consecutive samples in an order defined by a Manhattan distance of at least 2 between any neighboring samples.

7. The circuit according to claim 5, further including a decoder for receiving said S samples transmitted over said communication medium and for decoding said permuted order for reconstructing said time ordering of said S successive samples.

8. The circuit according to claim 5, wherein said permutator permutes said S consecutive samples in an order which provides storage of neighboring samples in said storage medium having different rows and columns of said M×N storage sites before said S consecutive samples are transmitted over said communication medium.

9. The circuit according to claim 5, wherein M and N are the same dimension.

10. A method for providing error-tolerant communication of information, said method comprising the steps of:

partitioning said information into a plurality of signals, each suitable for transmission over a communication medium, said plurality of signals being in consecutive time order;

permuting said plurality of signals;

transmitting said plurality of signals to a storage medium in response to at least one clock pulse of a clock signal;

storing said consecutive signals in different rows and columns of M×N storage sites of said storage medium where neighboring samples of said consecutive signals occupy different rows and columns of said M×N storage sites; and accessing and transmitting said plurality of signals stored in rows and columns over said communication medium in one of a column-by-column and a row-by-row method according to at least one communication protocol or timing arrangement wherein consecutive signals are transmitted nonconsecutively.

11. The method according to claim 10, wherein said M×N storage sites have a Manhattan distance of at least two.

12. The method according to claim 10, further including the steps of:

receiving signals transmitted over said communication medium; and de-permuting said signals received into said consecutive time order.

13. The method according to claim 11, wherein M and N are the same dimension.

* * * * *